(12) United States Patent
Teo et al.

(10) Patent No.: US 10,488,894 B2
(45) Date of Patent: Nov. 26, 2019

(54) ELECTROMAGNETIC RADIATION SHIELDING ON A PCI EXPRESS CARD

(71) Applicant: FINISAR CORPORATION, Sunnyvale, CA (US)

(72) Inventors: Tat Ming Teo, Singapore (SG); Chris Kiyoshi Togami, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/925,620

(22) Filed: Mar. 19, 2018

(65) Prior Publication Data

US 2019/0101962 A1 Apr. 4, 2019

Related U.S. Application Data

(63) Continuation of application No. 13/651,245, filed on Oct. 12, 2012, now abandoned.

(60) Provisional application No. 61/546,625, filed on Oct. 13, 2011.

(51) Int. Cl.
*G06F 1/18* (2006.01)
(52) U.S. Cl.
CPC .................................. *G06F 1/186* (2013.01)
(58) Field of Classification Search
CPC .............. H01R 13/512; H01R 13/6275; H01R 13/65802; H01R 13/6658; H01R 13/6594; H01R 13/659; G06F 1/186; G06F 1/182; H05K 5/0069; H05K 7/026; H05K 7/10; H05K 9/0007; H05K 9/0018; H05K 9/0022; H05K 9/0024; H05K 9/0058
See application file for complete search history.

(56) References Cited

U.S. PATENT DOCUMENTS

| | | | | | |
|---|---|---|---|---|---|
| 5,686,695 | A | * | 11/1997 | Chan | G06F 1/182 174/351 |
| 6,047,172 | A | * | 4/2000 | Babineau | H05K 9/0058 361/800 |
| 6,074,228 | A | * | 6/2000 | Berg | H01R 12/57 385/75 |
| 6,335,869 | B1 | * | 1/2002 | Branch | G02B 6/4201 174/367 |
| 6,945,820 | B1 | * | 9/2005 | Blichasz | H01R 13/6658 439/620.05 |
| 8,151,051 | B2 | * | 4/2012 | Cleveland | G06F 11/2089 710/301 |
| 8,342,881 | B2 | * | 1/2013 | Lang | H01R 9/038 439/607.01 |

(Continued)

*Primary Examiner* — Hoa C Nguyen
*Assistant Examiner* — Christopher L Augustin
(74) *Attorney, Agent, or Firm* — Maschoff Brennan

(57) ABSTRACT

An example embodiment includes an electromagnetic radiation (EMR) shield. The EMR shield is configured to reduce EMR from escaping a host device. The EMR shield includes a structure, two or more module-grounding tabs, and multiple fingers. The structure is configured to substantially surround two or more adjacent transceiver modules positioned in an opening defined in a bezel. The two or more module-grounding tabs extend from the structure. Each of the module-grounding tabs is configured to contact one of the transceiver modules. The fingers extend from the structure and are configured to contact the bezel at multiple contact areas substantially surrounding the opening.

17 Claims, 15 Drawing Sheets

(56) References Cited

U.S. PATENT DOCUMENTS

| | | | | |
|---|---|---|---|---|
| 2003/0176091 A1* | 9/2003 | Huang | ................. | H01R 13/639 |
| | | | | 439/160 |
| 2004/0077217 A1* | 4/2004 | Hwang | ................ | H05K 9/0058 |
| | | | | 439/607.2 |
| 2004/0142094 A1* | 7/2004 | Narayanan | ............... | A61L 31/10 |
| | | | | 427/2.1 |
| 2005/0037655 A1* | 2/2005 | Henry | ................ | H01R 23/6873 |
| | | | | 439/341 |
| 2006/0126306 A1* | 6/2006 | Blair | .................... | G02B 6/4201 |
| | | | | 361/716 |
| 2009/0257202 A1* | 10/2009 | Lee | ...................... | H05K 9/0058 |
| | | | | 361/729 |
| 2010/0261378 A1* | 10/2010 | Davison | ............... | G02B 6/3897 |
| | | | | 439/540.1 |
| 2011/0053415 A1* | 3/2011 | Fonteneau | ........... | H05K 9/0058 |
| | | | | 439/607.01 |

\* cited by examiner

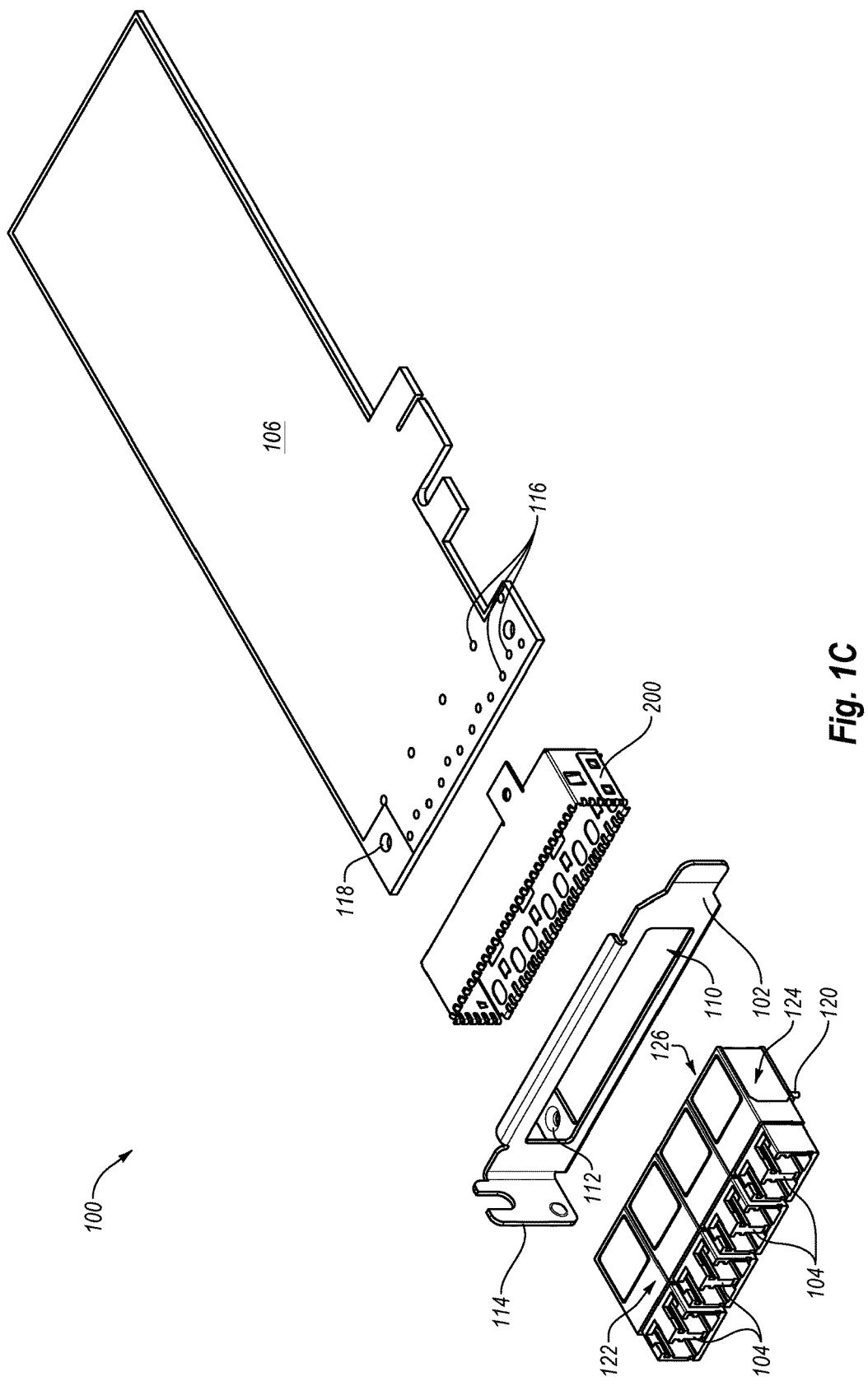

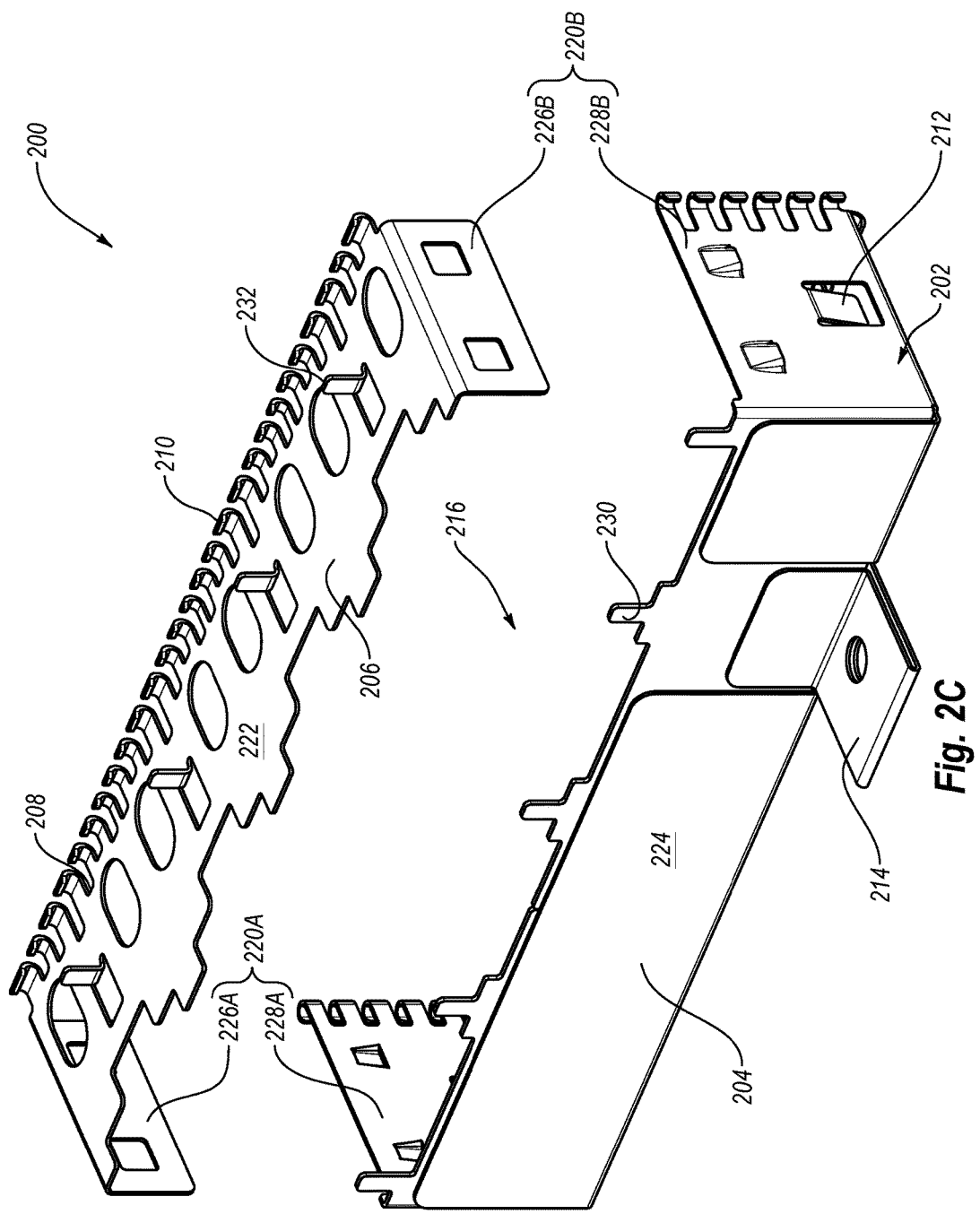

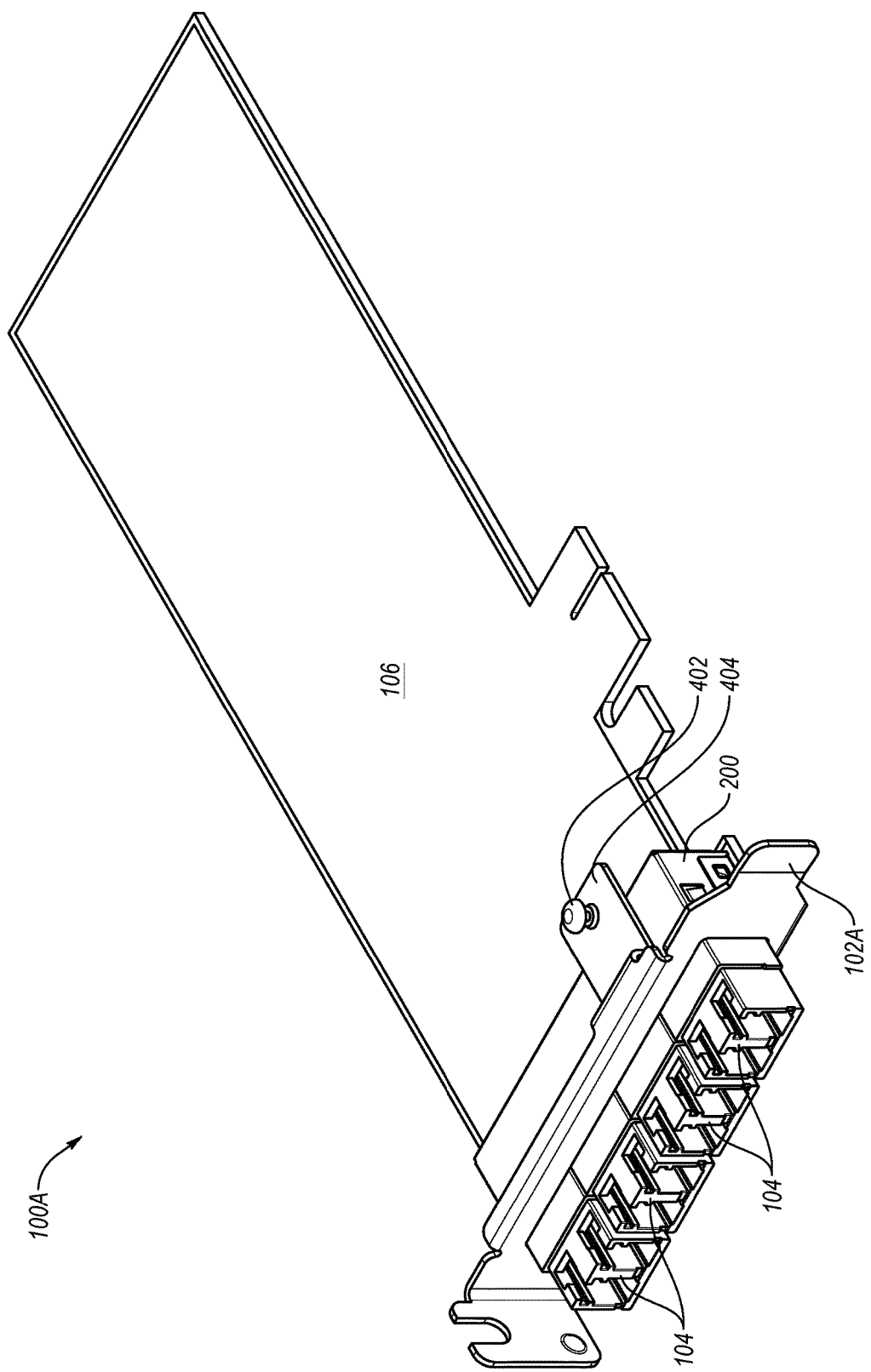

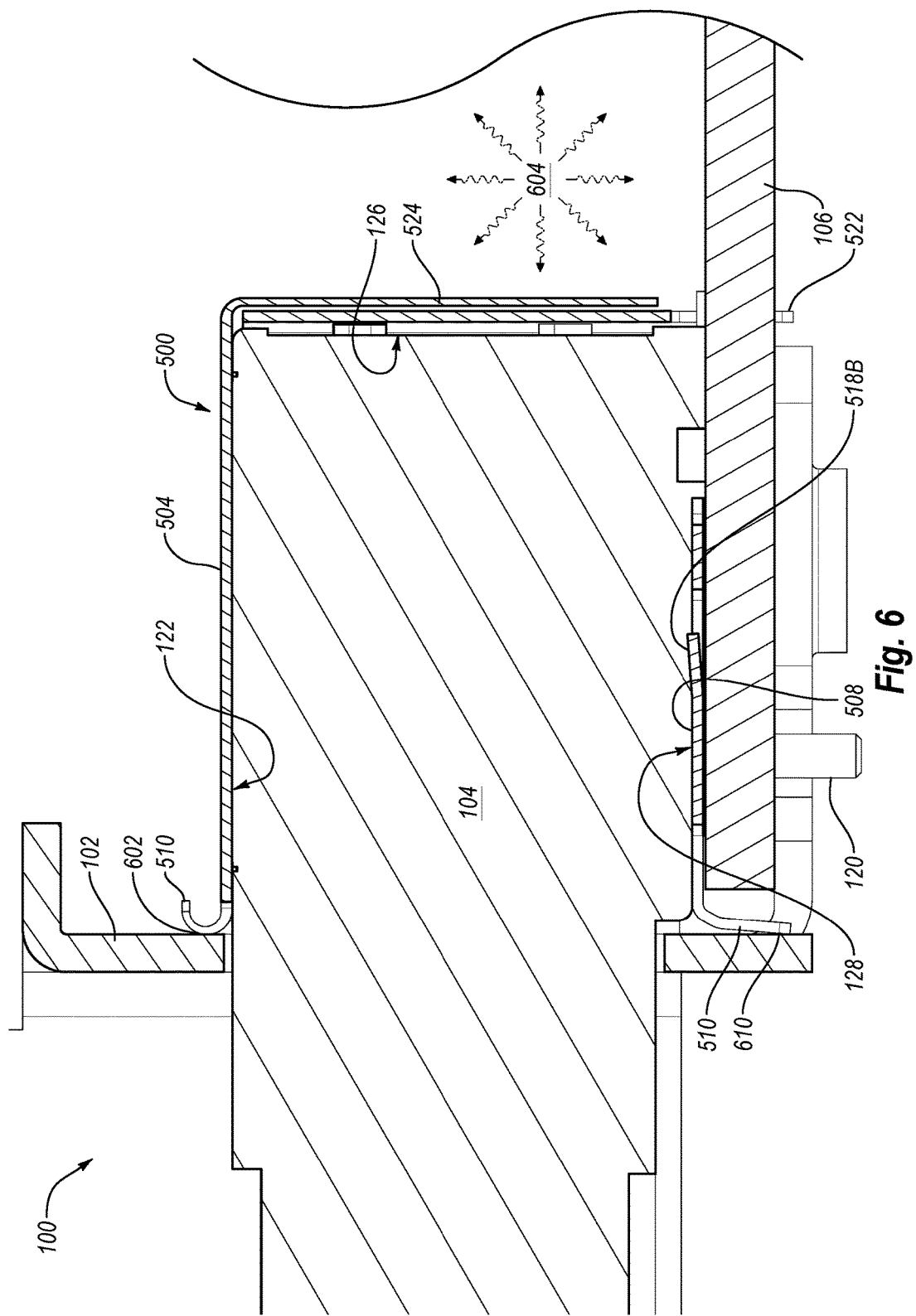

ELECTROMAGNETIC RADIATION SHIELDING ON A PCI EXPRESS CARD

CROSS-REFERENCE TO A RELATED APPLICATION

This application claims priority to and the benefit of U.S. Provisional Patent Application Ser. No. 61/546,625, filed on Oct. 13, 2011 and U.S. patent application Ser. No. 13/651,245 filed Oct. 12, 2012 which are incorporated herein by reference in their entireties.

BACKGROUND

Field

Some embodiments described herein relate to electromagnetic radiation (EMR) shields for use in connection with optical transceiver modules.

Related Technology

Electronic modules, such as electronic or optoelectronic transceiver or transponder modules, are increasingly used in electronic and optoelectronic communication. Electronic modules typically communicate with a host device by transmitting electrical signals to the host device and receiving electrical signals from the host device. These electrical signals can then be transmitted by the electronic module outside the host device as optical and/or electrical signals.

One common difficulty associated with the operation of electronic modules is the generation of electromagnetic radiation (EMR). The generation of EMR during the operation of an electronic module is a matter of significant concern because such EMR can cause electromagnetic interference (EMI) with other systems and devices in the vicinity, which can seriously impair, if not prevent, the proper operation of those other systems and devices. Thus, the control of EMI effects is an important consideration in the design and use of electronic modules.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME SAMPLE EMBODIMENTS

This Summary is provided to introduce a selection of concepts in a simplified form that are further described below in the Detailed Description. This Summary is not intended to identify key features or characteristics of the claimed subject matter, nor is it intended to be used as an aid in determining the scope of the claimed subject matter.

An example embodiment includes an electromagnetic radiation (EMR) shield. The EMR shield is configured to reduce EMR escaping from a host device. The EMR shield includes a structure, two or more module-grounding tabs, and a plurality of fingers. The structure is configured to substantially surround two or more adjacent transceiver modules positioned in an opening defined in a bezel. The two or more module-grounding tabs extend from the structure. Each of the module-grounding tabs is configured to contact one of the transceiver modules. The fingers extend from the structure and are configured to contact the bezel at a plurality of contact areas substantially surrounding the opening.

Another example embodiment includes a peripheral component interconnect express (PCIe) card. The PCIe card includes a bezel, two or more adjacent transceiver modules, a printed circuit board (PCB), and an EMR shield. The bezel defines an opening. The two or more adjacent transceiver modules are positioned in the opening. The PCB is mechanically coupled to the bezel and to the transceiver modules. The EMR shield is configured to reduce EMR that escapes through the opening from a host device into which the PCIe card is received. The EMR shield includes a structure defining an enclosure configured to at least partially enclose the transceiver modules. The EMR shield further includes a plurality of fingers extending from the structure, which is configured to contact the bezel at a plurality of contact areas substantially surrounding the opening.

Another example embodiment includes a PCIe card. The PCIe card includes a bezel, two or more adjacent transceiver modules, a PCB, and an EMR shield. The bezel defines an opening. The two or more adjacent transceiver modules are positioned in the opening. The PCB is mechanically coupled to the bezel and to the transceiver module. The EMR shield is configured to reduce EMR that escapes through the opening from a host device into which the PCIe card is received. The EMR shield includes a structure that substantially surrounds the transceiver modules. The EMR shield further includes a plurality of ridges defined in the structure. The ridges are configured to contact the bezel at a plurality of contact areas substantially surrounding the opening.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which:

FIGS. 1A-1C are an example peripheral component interconnect express (PCIe) card;

FIGS. 2A-2C are an example electromagnetic radiation (EMR) shield that can be implemented in the PCIe card of FIGS. 1A-1C;

FIGS. 4A and 4B are an example of an alternative PCIe card;

FIG. 6 is a partial sectional view of the PCIe card of FIGS. 1A-1C including the second example EMR shield of FIGS. 5A-5C;

DETAILED DESCRIPTION OF SOME EXAMPLE EMBODIMENTS

Example embodiments of the invention relate to electromagnetic radiation (EMR) shields for use in connection with optical transceiver modules, such as those employed in a peripheral component interconnect express (PCIe) card. The EMR shields disclosed herein effectively maintain EMR emitted from a host device at acceptable levels to avoid electromagnetic interference (EMI) in surrounding devices.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1A:
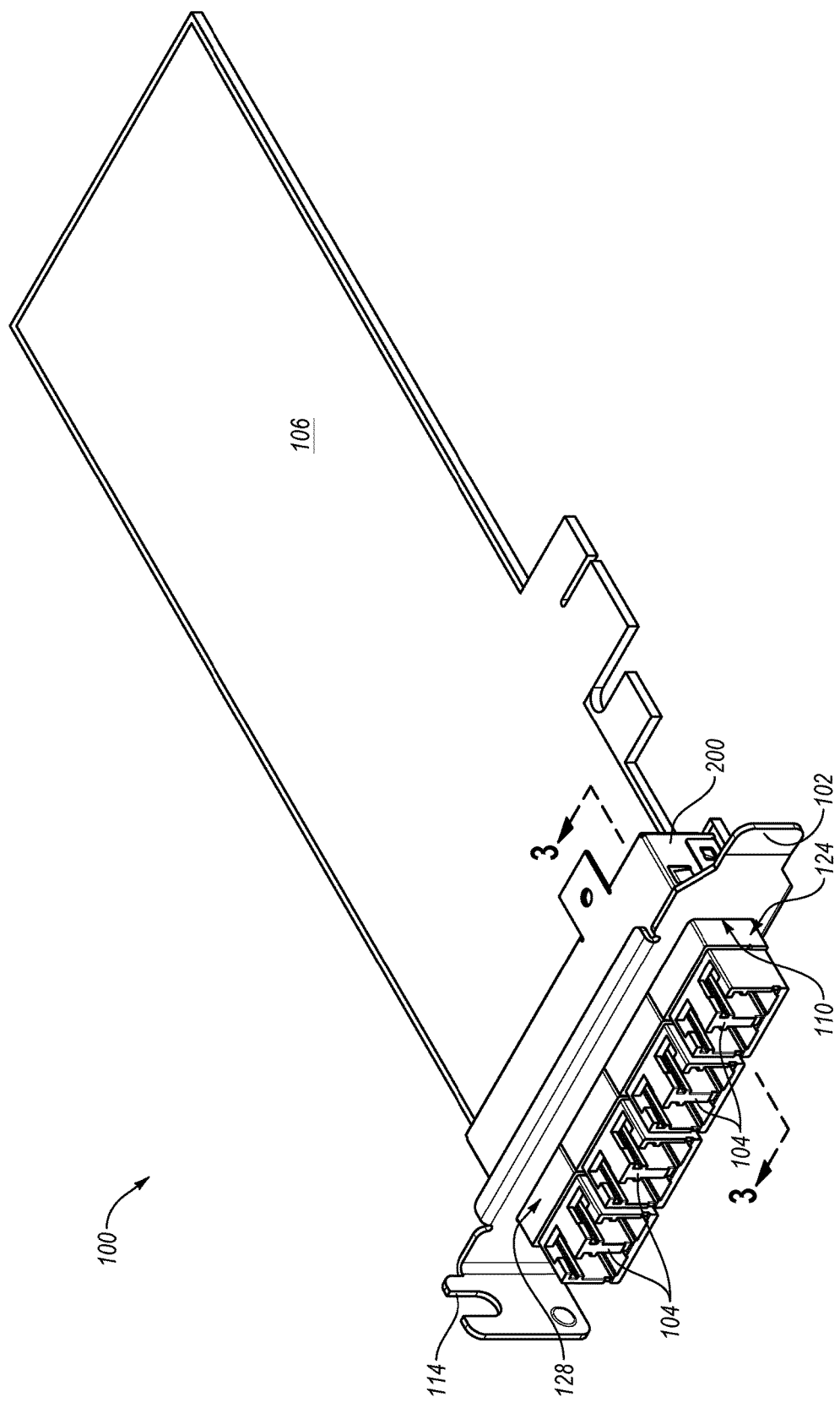
Figure 1B:
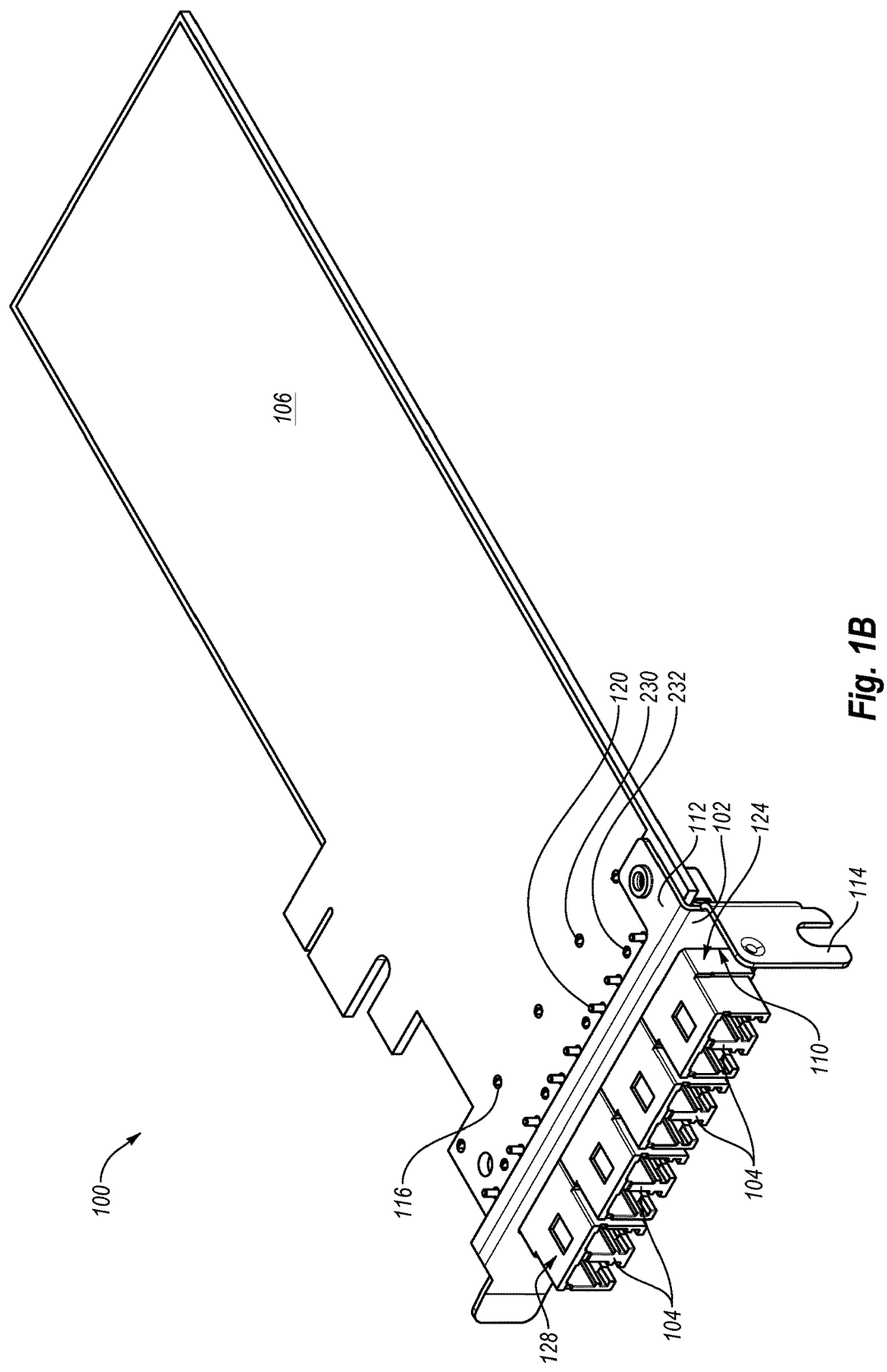

Reference is first made to FIGS. 1A-1C which disclose some aspects of an example PCIe card 100. Specifically, FIG. 1A depicts a top-perspective view of the PCIe card 100; FIG. 1B depicts a bottom-perspective view of the PCIe card 100; and FIG. 1C depicts a top exploded view of the PCIe card 100. The PCIe card 100 represents one example operating environment in which embodiments of the invention disclosed herein may be implemented. It should be appreciated that one or more embodiments disclosed herein may be implemented in the PCIe card 100 as well as other environments.

The PCIe card 100 may be used in transmitting and receiving optical signals in connection with a host device (not shown) into which the PCIe card 100 is received. The PCIe card 100 includes one or more optoelectronic transceiver modules (modules) 104. The PCIe card 100 includes four modules 104; however, this is not meant to be limiting. In some embodiments, the PCIe card 100 may include three or fewer modules 104 or five or more modules 104.

The modules 104 may be mechanically coupled to a printed circuit board (PCB) 106 included in the PCIe card 100. With specific reference to FIG. 1C, the PCB 106 may include multiple pin openings 116. Note that only three of the multiple pin openings 116 are explicitly labeled in FIG. 1C, but the PCB 106 includes seventeen pin openings 116. The number and configuration of the pin openings 116 may vary depending on the number of modules 104 and the configuration of an EMR shield (described below) included in the PCIe card 100.

As best illustrated in FIG. 1B, each of the modules 104 may include module pins 120 configured to be received by some of the pin openings 116 defined in the PCB 106. The module pins 120 may be soldered or otherwise secured to the PCB 106, thereby mechanically coupling the modules 104 to the PCB 106. Note that only one of the module pins 120 is explicitly labeled in FIG. 1B, but FIG. 1B includes eight module pins 120 received in some of the pin openings 116.

Referring back to all of FIGS. 1A-1C, in addition to mechanically coupling the modules 104 to the PCB 106, the modules 104 may be in electronic communication with the PCB 106. The electrical communication between the PCB 106 and the modules 104 enables optical signals received by one or more of the modules 104 via optical fibers (not shown) that are plugged into the front of the modules 104 to be communicated via the PCB 106 to the host device. Additionally, electrical signals originating at the host device may be communicated via the PCB 106 to one or more of the modules 104. The modules 104 may transduce the electrical signals to optical signals and transmit the optical signals via optical fibers (not shown) that are plugged into the front of the modules 104.

Each of the modules 104 may be configured for optical signal transmission and reception at a variety of per-second data rates including, but not limited to, 1 gigabit (G), 2 G, 2.5 G, 4 G, 8 G, 10 G, 10.7 G, or higher. The modules 104 may also be configured for optical signal transmission and reception at one or more wavelengths including, but not limited to, 850 nanometers (nm), 1310 nm, 1470 nm, 1490 nm, 1510 nm, 1530 nm, 1550 nm, 1570 nm, 1590 nm, or 1610 nm. Further, the modules 104 may be configured to support various transmission standards including, but not limited to, Optical Fast Ethernet, Optical G Ethernet, 10 G Ethernet, 40 G Ethernet, 100 G Ethernet, 1×, 2×, 4×, 8×, 10×, and 16× Fibre Channel, SONET OC-3, OC-12, OC-48, OC-192, OC-768, 10 Gigabit Fibre Channel, 10 G Ethernet, 100 BASE-T, and PON. Further, the modules 104 can be configured to operate properly with a case temperature range of −40° C. to 85° C. In addition, in some embodiments, the modules 104 may have a form factor that is substantially compliant with any of a variety of public standards such as the SFP+ MSA, the SFF MSA, the SFP MSA, the CFP MSA, or the CXP MSA, or any proprietary standard. However, the modules 104 are not necessarily compliant with a standard and may be customized for a particular application. Each of the modules 104 depicted in FIGS. 1A-1C include an LC transmit port and an LC receive port configured to send and receive optical signals over optical fibers (not shown) that are plugged into the front of the modules 104.

The modules 104 may include a top surface 122 (FIGS. 1A and 1C), a bottom surface 128 (FIG. 1B), a rear surface 126 (FIG. 1C), and two side surfaces 124. One of the side surfaces 124 is visible in FIGS. 1A and 1C and a second of the side surfaces 124 is visible in FIG. 1B. The modules 104 are positioned adjacent to one another in an opening 110 defined in a bezel 102. The bezel 102 generally frames the modules 104 and may enable the PCIe card 100 to be mounted within the host device. For example, a PCIe card tab 114 may engage a corresponding structure in the host device to secure the PCIe card 100 to the host device.

The bezel 102 may also be mechanically coupled to the PCB 106. With specific reference to FIGS. 1B and 1C, the bezel 102 may include a bezel connector 112 defining an opening that corresponds to bezel receiving opening 118 (FIG. 1C) defined in the PCB 106. A fastener (not shown) or an equivalent mechanism may be implemented to mechanically couple the bezel 102 to the PCB 106. In some embodiments, the bezel connector 112 may also electrically ground the bezel 102 to the PCB 106.

The opening 110 (best illustrated in FIG. 1C) defined in the bezel 102 is substantially rectangular to correspond to the modules 104 positioned therein. However, the opening 110 may not be precisely sized to fit the modules 104. Thus, during operation of PCIe card 100 and/or the host device, EMR may escape from the bezel 102 through the opening 110. For example, EMR from components (not shown) located on the PCB 106 may escape from the host device through the opening 110 by radiating above, beneath, to the side of, and/or between the adjacent modules 104. The EMR may cause EMI, which may cause problems in other electronic systems in the vicinity of the PCIe card 100.

To reduce the EMR escaping from the host device through the opening 110, the PCIe card 100 may include an EMR shield 200 (FIGS. 1A and 1C). The EMR shield 200 may be composed of electrically-conductive material to shield against some of the EMR produced in the host device. Additionally, the EMR shield 200 may substantially surround and/or at least partially enclose the modules 104 positioned in the opening 110 and contact the bezel 102 at contact areas that surround the opening 110. The EMR shield 200 may therefore fill some of the gaps between the modules 104 and between the bezel 102 and/or fill the gaps between the modules 104 to block EMR from escaping through the opening 110. Additionally, the contact between the EMR shield 200 and the bezel 102 may ground the EMR shield 200 to further reduce EMR escaping from the host devices.

Figure 2A:
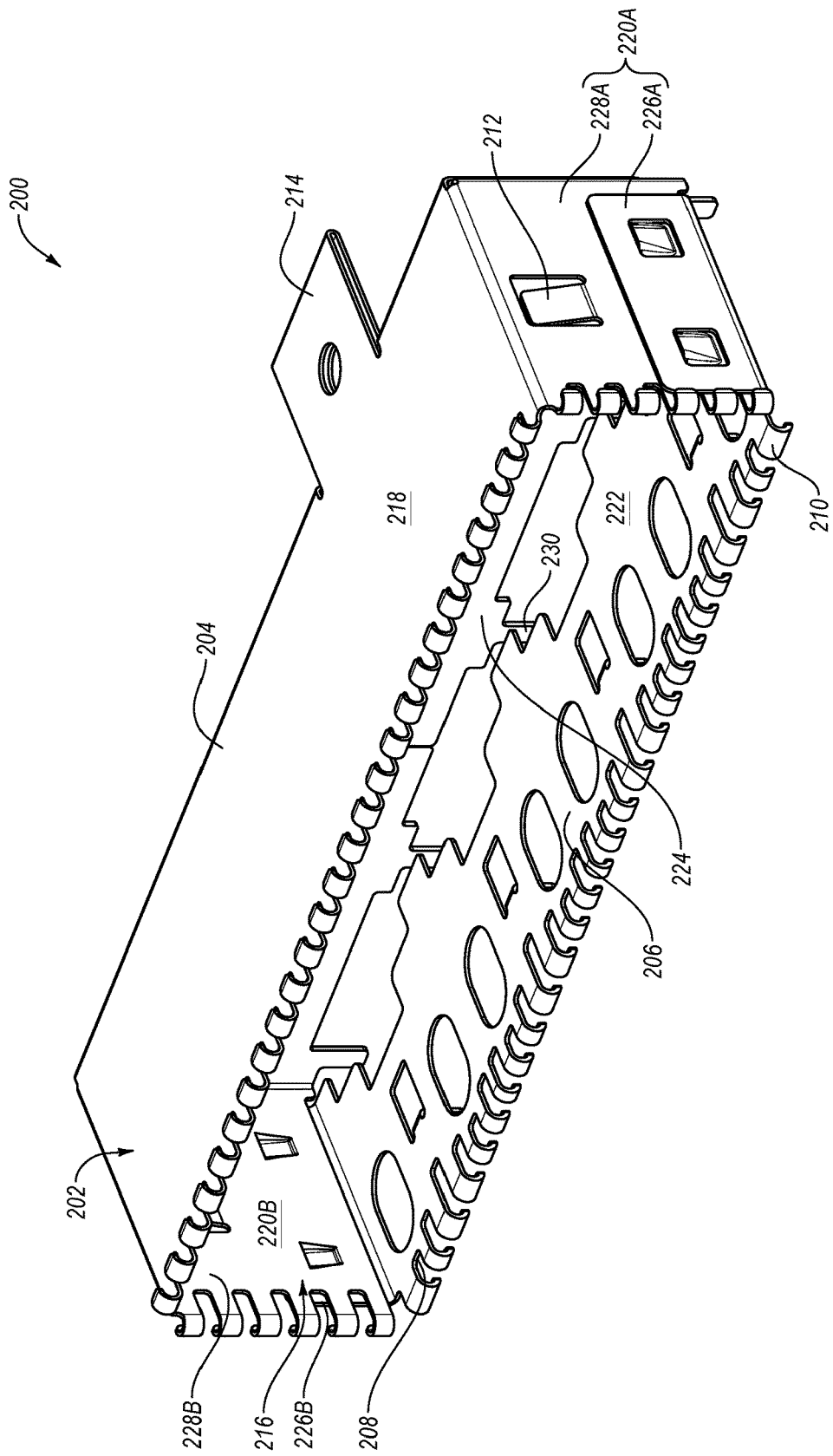
Figure 2B:
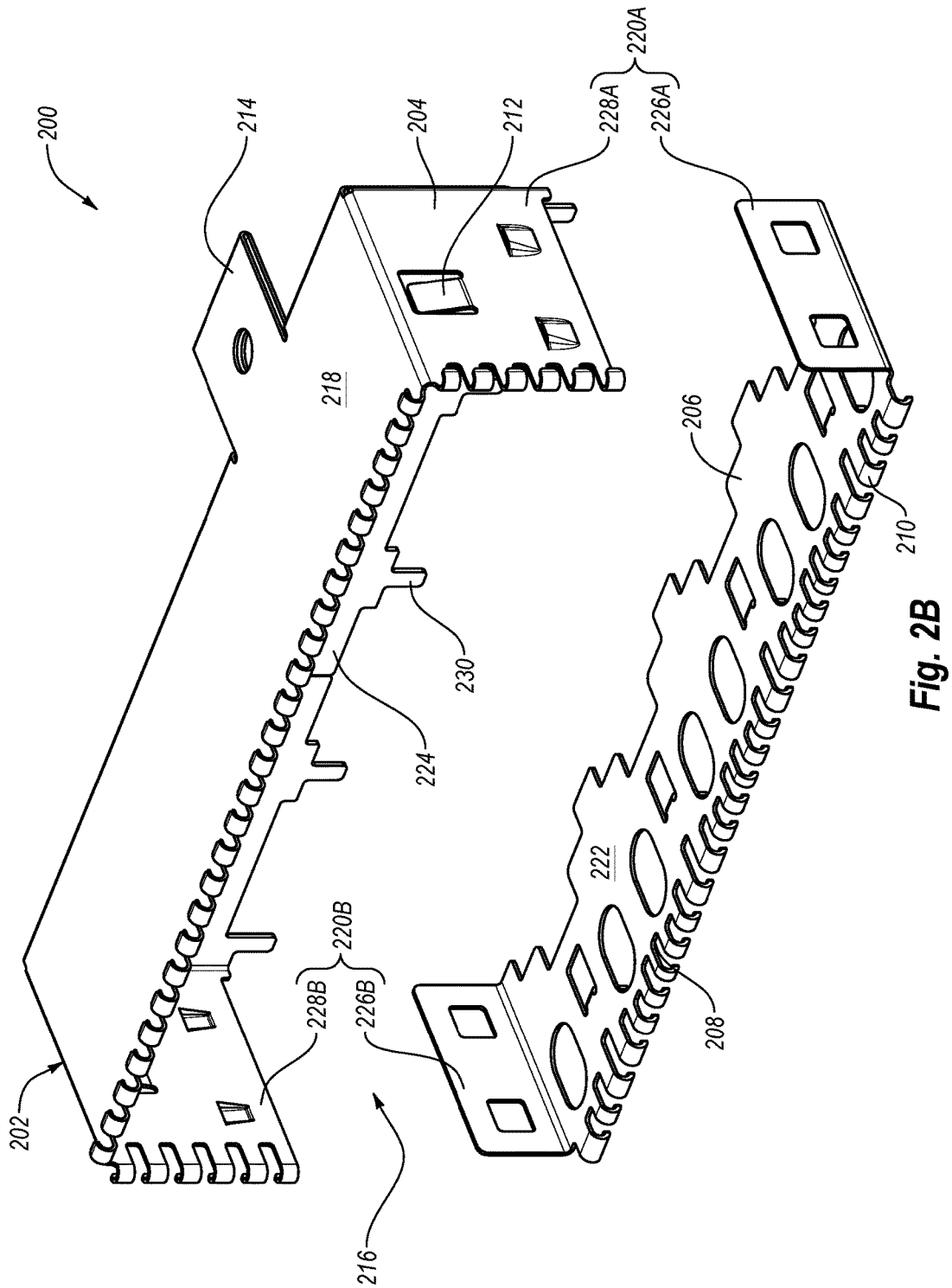

FIGS. 2A-2C illustrate some additional details of the EMR shield 200. The EMR shield 200 includes a structure 202. The structure 202 refers to the portion of the EMR shield 200 which is configured to substantially surround and/or at least partially enclose modules such as the modules 104 of FIGS. 1A-1C.

Specifically, with combined reference to FIGS. 1A-1C and 2A-2C, the structure 202 includes an upper wall 218 (FIGS. 2A-2B), a lower wall 222, two side walls 220A/220B, and a rear wall 224. Each of the upper wall 218, the lower wall 222, and the two side walls 220A/220B are configured to be positioned parallel to one of the surfaces (i.e., surface 122, 124, 126, or 128) of the modules 104. For example, the upper wall 218 may be configured to be positioned parallel to the top surface 122 of the modules 104. The lower wall 222 may be configured to be positioned parallel to the bottom surface 128 of the modules 104. The two side walls 220A/220B may be configured to be positioned parallel to side surfaces 124 of the modules 104. The rear wall 224 may be configured to be positioned parallel to a rear surface 126 of the module 104. Thus, the structure 202 defines an enclosure 216 within which the modules 104 are at least partially enclosed.

As used herein with reference to the structure 202 and other structures described elsewhere herein, the term "surrounds" refers to a relationship between the modules 104 and the upper wall 218, the lower wall 222, and the two side walls 220A/220B. That is, the upper wall 218, the lower wall 222, and the two side walls 220A/220B create a band that borders and/or otherwise contacts the modules 104 along the top surface 122, the bottom surface 128, and the two side surfaces 124 without bordering or otherwise contacting the front of the modules 104 or a rear surface 126 of the modules 104. In contrast, as used herein with reference to the structure 202 and other structures described elsewhere herein, the term "enclosed" refers to a relationship between the enclosure 216 and the modules 104. That is, the enclosure 216 borders and/or otherwise contacts the modules 104 on the top surface 122, the bottom surface 128, the rear surface 126, and the two side surfaces 124.

The structure 202 may be generally constructed from an upper piece 204 and a lower piece 206. In FIGS. 2B and 2C, the upper piece 204 is shown separate from the lower piece 206. In FIG. 2A, the upper piece 204 is shown assembled with the lower piece 206. The upper piece 204 may include the upper wall 218, the rear wall 224, and upper portions of the side walls 228A/228B. The lower piece 206 may include the lower wall 222 and lower portions of the side walls 226A/226B. The upper portions of the side walls 228A/228B may engage with the lower portions of the side walls 226A/226B to secure the upper piece 204 to the lower piece 206.

With combined reference to FIGS. 1B, 1C, and 2C, the EMR shield 200 may be mechanically coupled to the PCB 106. In some embodiments, the lower piece 206 may be positioned and/or secured between the modules 104 and the PCB 106 when assembled in the PCIe card 100. The upper piece 204 can then be positioned onto the modules 104 and secured to the lower piece 206. In these and other embodiments, the lower piece 206 may include connectors 230 and/or the upper piece may include connectors 232. The connectors 232 and 230 may be used to secure the upper piece 204 and/or the lower piece 206 to the PCB 106. The connectors 232 included on the upper piece 204 may extend from the rear wall 224 to be received in one or more of the pin openings 116 defined in the PCB 106. The connectors 230 extend from the lower piece 206 and may be received in one or more of the pin openings 116 defined in the PCB 106. The connectors 230 and 232 may be soldered or otherwise secured to the PCB 106 to mechanically and/or electrically couple the EMR shield 200 to the PCB 106.

Referring back to FIGS. 2A-2C, module-grounding tabs 212 may also extend from the structure 202. Specifically, in the depicted embodiment, the structure 202 includes two module-grounding tabs 212. One of the module-grounding tabs 212 is visible in FIGS. 2A and 2B and a second module-grounding tab 212 is visible in FIG. 2C. The module-grounding tabs 212 extend from the side walls 220A/220B to contact modules, such as one of the modules 104 of FIGS. 1A-1C, positioned in the structure 202. The module-grounding tabs 212 may provide a chassis ground for the modules. For example, an electric ground may be transferred from a shell of a module 104 to the structure 202, via the module-grounding tabs 212, and then to one or more of the connectors 230 and/or 232.

The structure 202 also includes an outer edge 208. The outer edge may include an edge of the structure 202 opposite the rear wall 224. The outer edge 208 may be defined along the upper wall 218, the lower wall 222, and the two side walls 220A/220B. In the depicted embodiment, along the side walls 220A/220B, the outer edge 208 is defined along the upper piece 204 (i.e., the upper portions of the side walls 228A/228B), and the outer edge 208 may not be defined along the lower piece 206 (i.e., the lower portions of the side walls 226A/226B). Fingers 210 may extend from the outer edge 208. The fingers 210 may be configured to contact a bezel around an opening. For example, with combined reference to FIGS. 1C and 2A-2C, the fingers 210 may be configured to contact the bezel 102 around the opening 110. The fingers 210 that extend from the upper piece 204, that is, along a portion of the outer edge 208 defined along the upper wall 218 and the two side walls 220A/220B, may be curved. The fingers 210 that extend from the lower piece 206, that is, along a portion of the outer edge 208 defined along the lower wall 222, may additionally be curved.

In this and other embodiments, the fingers 210 may be substantially evenly spaced along the outer edge 208 and thus substantially evenly spaced around an opening contacted by the fingers 210. However, this is not meant to be limiting. In alternative embodiments, the fingers 210 may be unevenly spaced along the outer edge 208 and thus unevenly spaced around an opening contacted by the fingers 210.

Referring back to FIGS. 2A-2C, in this and other embodiments, the EMR shield 200 includes a bezel coupling structure 214 extending substantially perpendicular from the rear wall 224. The bezel coupling structure 214 may define an opening configured to receive a fastener (not shown) to secure a bezel, such as the bezel 102 of FIGS. 1A-1C, to the EMR shield 200. Some additional details of the bezel coupling structure 214 are provided with reference to FIGS. 4A and 4B.

Figure 3:
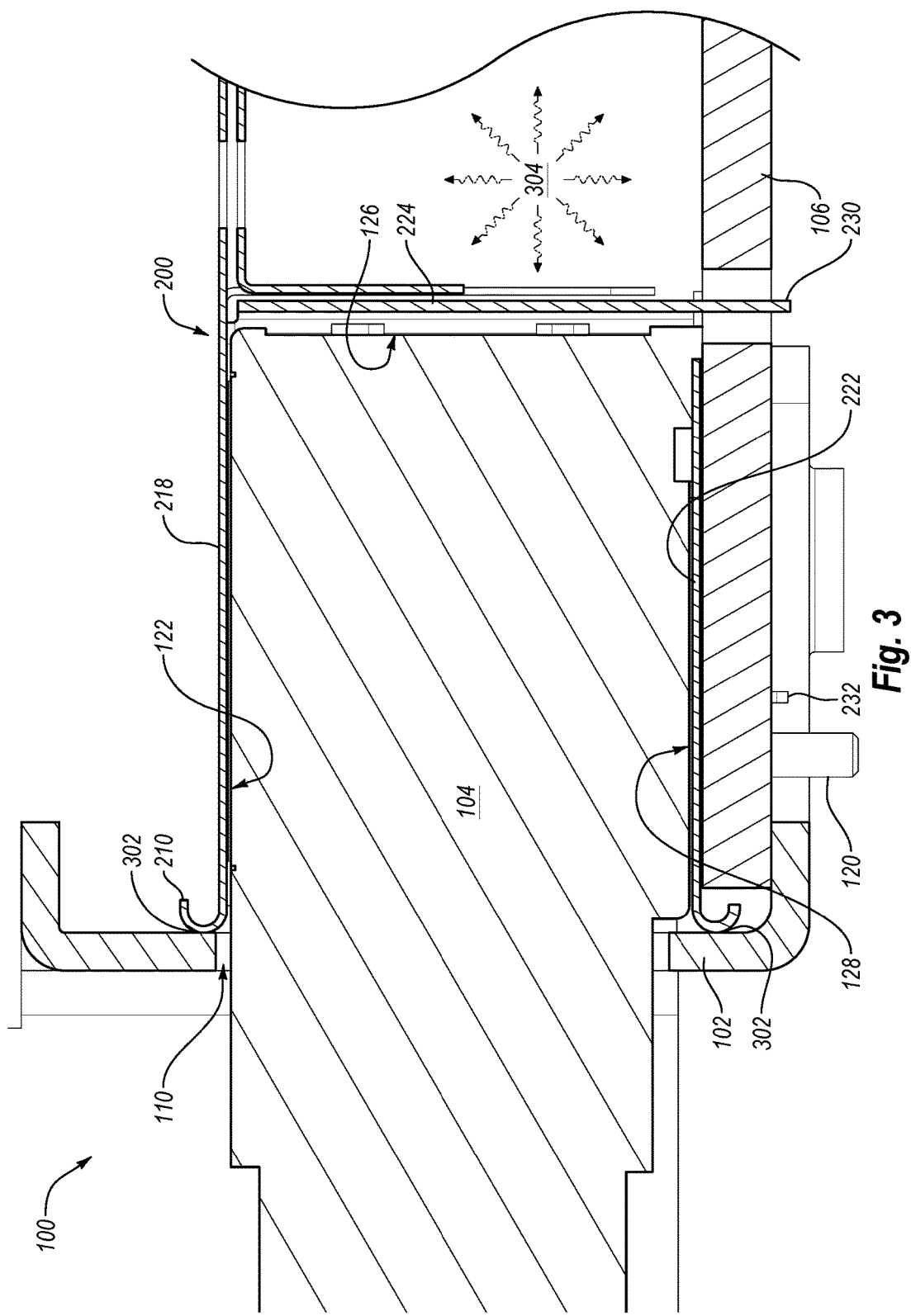
FIG. 3 is a partial, sectional view of the PCIe card of FIGS. 1A-1C including the EMR shield of FIGS. 2A-2C.

FIG. 3 illustrates a partial, sectional view of the PCIe card 100 of FIGS. 1A-1C including the EMR shield 200 described with reference to FIGS. 1A-2C. The module 104, the bezel 102, and the PCB 106 described with reference to FIGS. 1A-1C and the EMR shield 200 described with reference to FIGS. 1A-2C are included in FIG. 3. The EMR shield 200 is depicted mechanically coupled to the PCB 106 though connectors 230 and 232 received in the PCB 106. Additionally, FIG. 3 depicts the modules 104 mechanically coupled to the PCB 106 through the module pin 120 received in the PCB 106. In this configuration, the modules 104 are at least partially enclosed by the EMR shield 200. Specifically, the upper wall 218 borders the top surface 122, the rear wall 224 borders the rear surface 126, and the lower wall 222 borders the bottom surface 128.

Additionally, FIG. 3 depicts an EMR source 304, which may be electronic components (not shown) on the PCB 106 or other electronic components within a host device (not shown) from which EMR may be emitted. The EMR shield 200 reduces EMR escaping from the opening 110 by the fingers 210 contacting the bezel 102 around the opening 110 at one or more contact areas 302. The contact areas 302 substantially surround the opening 110 and thereby shield at least a portion of the EMR emitted by the EMR source 304.

Figure 4B:
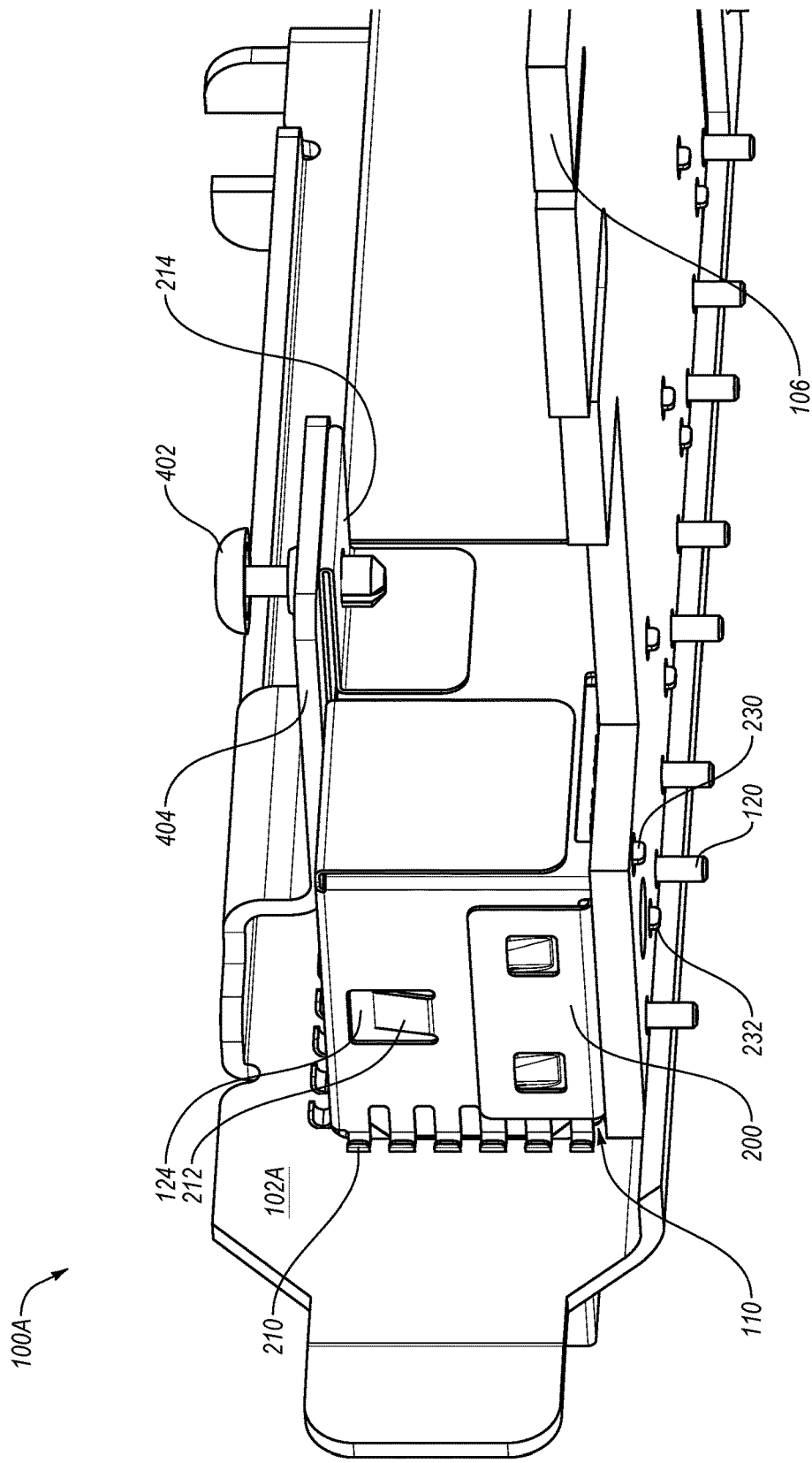

FIGS. 4A and 4B illustrate an example of an alternative PCIe card 100A. The alternative PCIe card 100A is substantially similar to the PCIe card 100 described with reference to FIGS. 1A-1C. However, the alternative PCIe card 100A includes an alternative bezel 102A. The alternative bezel 102A is substantially similar to the bezel 102 described with reference to FIGS. 1A-1C other than the alternative bezel 102A may include an EMR shield coupling structure 404 and a fastener 402. The EMR shield coupling structure 404 and the fastener 402 are configured to mechanically couple the alternative bezel 102A to the EMR shield 200.

As depicted in FIG. 4B, the EMR shield coupling structure 404 extends over the bezel coupling structure 214, described above with reference to FIGS. 2A-2C. The EMR shield coupling structure 404 is secured to the bezel coupling structure 214 using the fastener 402.

Additionally, as depicted in FIG. 4B, the fingers 210 extending from the EMR shield 200 contact the alternative bezel 102A. The fingers 210 are substantially evenly spaced around the opening 110. The EMR shield 200 is also shown mechanically coupled to the PCB 106 by the connectors 232 and 230 being received by the PCB 106. The modules 104 (visible in FIG. 4A) are shown mechanically coupled to PCB 106 by the module pins 120 being received in the PCB 106. Additionally, the module-grounding tab 212, described with respect to FIGS. 2A-2C, is depicted contacting the side surface 124.

Figure 5A:
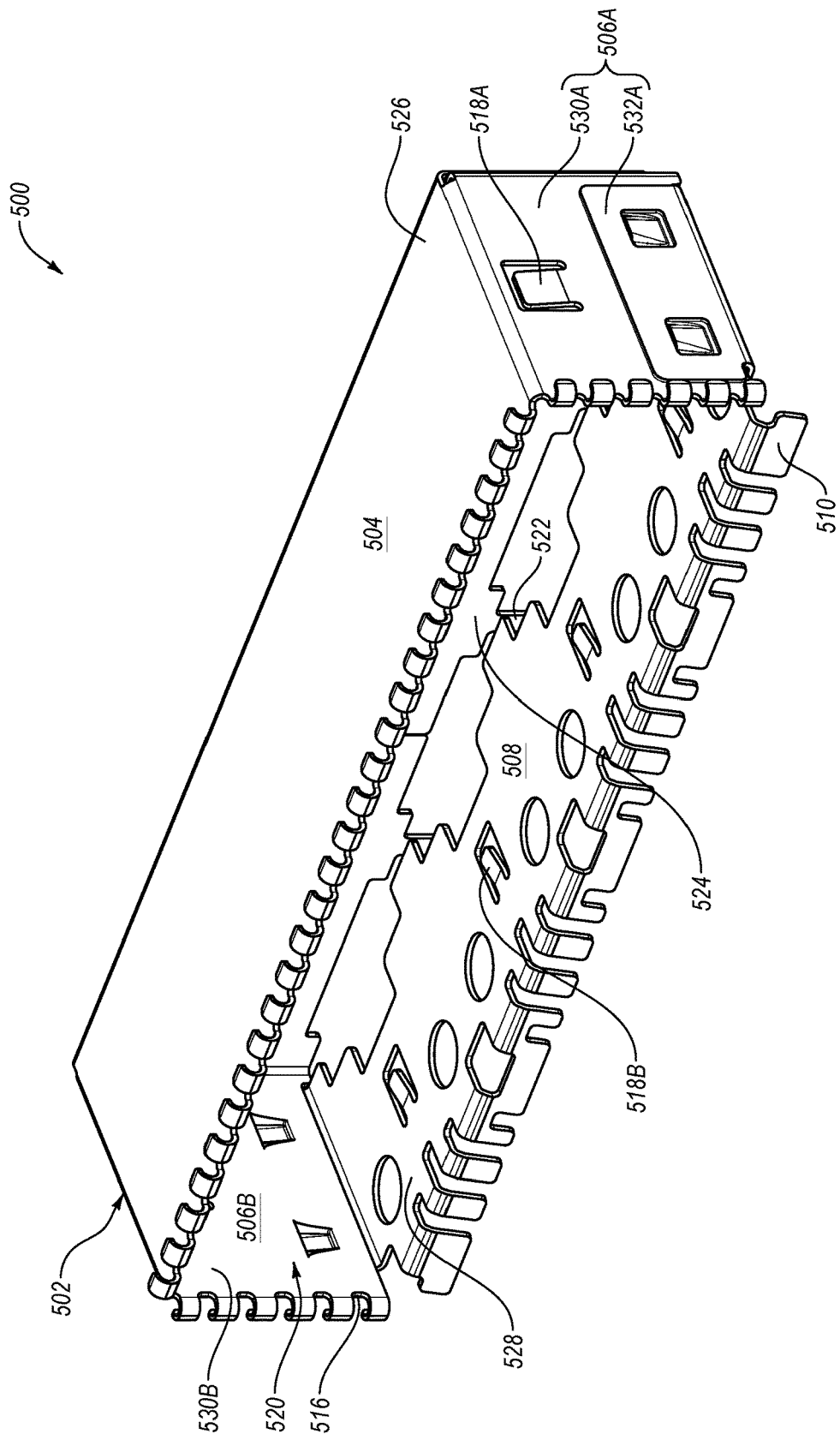
FIGS. 5A-5C are a second example EMR shield that may be implemented in the PCIe card of FIGS. 1A-1C.
Figure 5B:
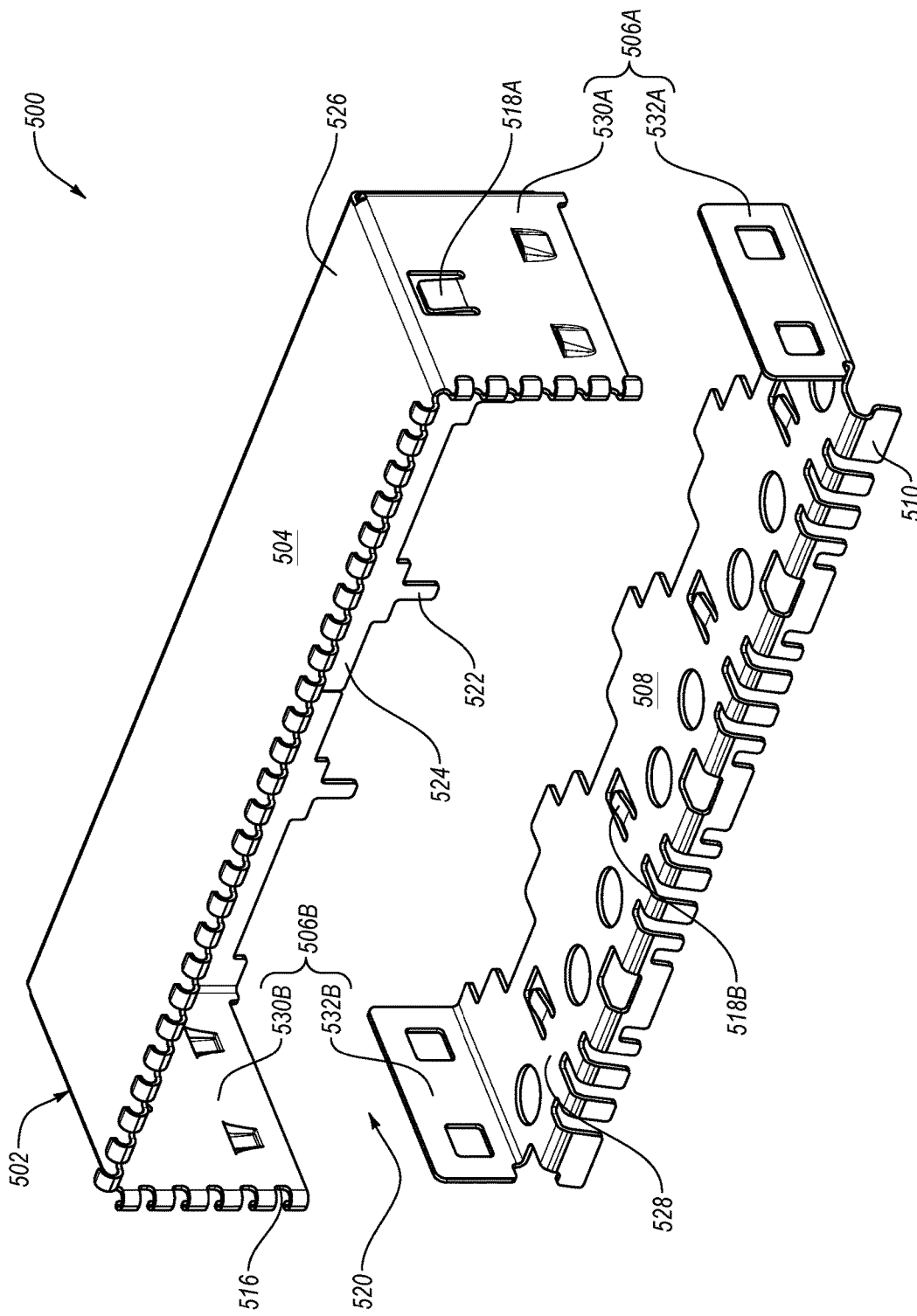
Figure 5C:
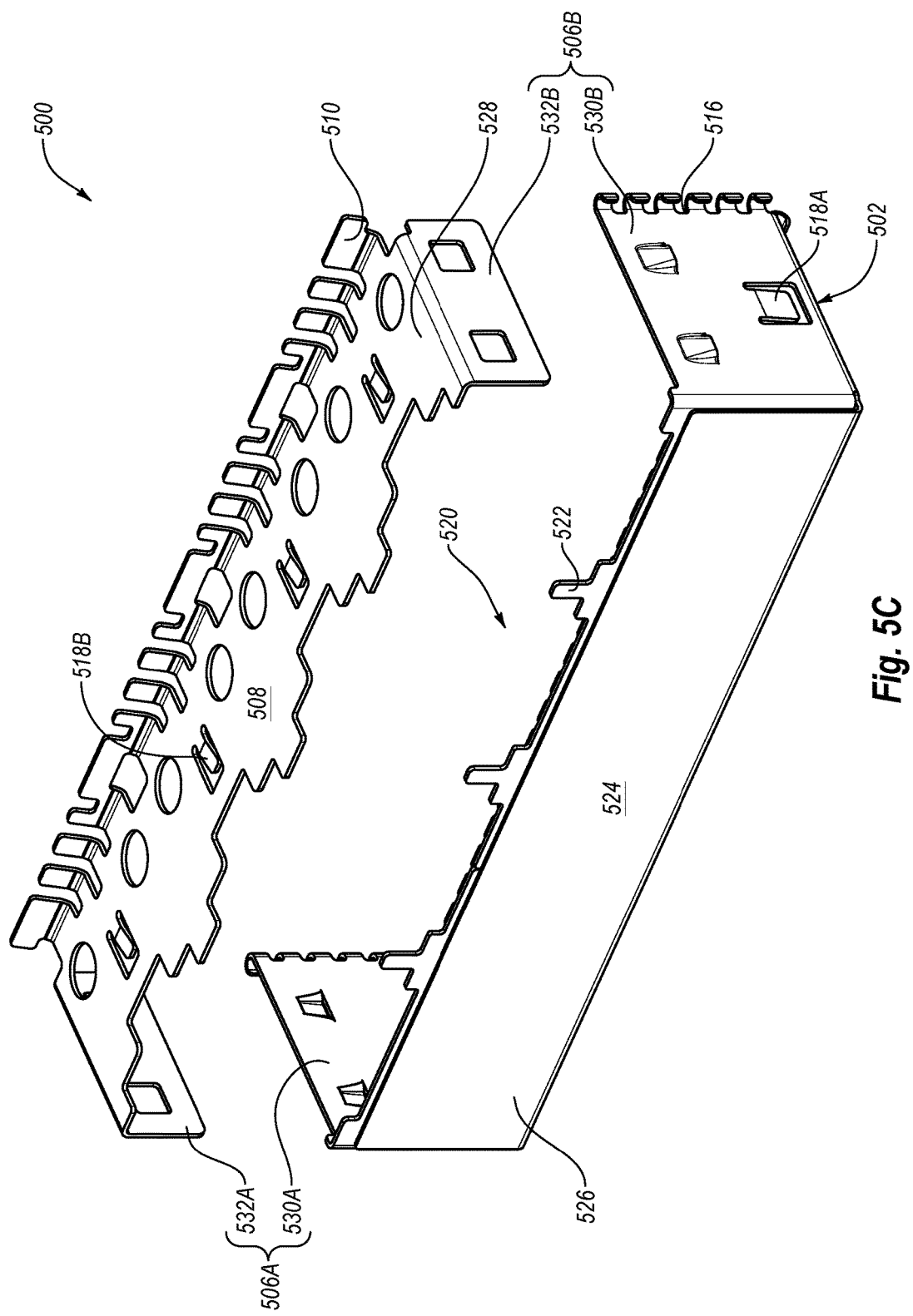

FIGS. 5A-5C illustrate a second example EMR shield 500 that may be implemented in the PCIe card 100 of FIGS. 1A-1C. The second EMR shield 500 includes some similar features to the EMR shield 200 described with reference to FIGS. 1A-2C.

The EMR shield 500 may include a structure 502. The structure 502 refers to the portion of the second EMR shield 500 which is configured to substantially surround and/or at least partially enclose modules, such as the modules 104 of FIGS. 1A-1C. Like structure 202 described with reference to FIGS. 2A-2C, the structure 502 includes an upper wall 504 (FIGS. 5A and 5B), a lower wall 508, two side walls 506A/506B, and a rear wall 524 which may be configured to be positioned parallel to the surfaces (i.e., surfaces 122, 124, 126, and 128 of FIGS. 1A-1C) of the modules 104. Thus, the structure 502 defines an enclosure 520 within which modules 104 are at least partially enclosed.

The structure 502 may constitute an upper piece 526 and a lower piece 528. The upper piece 526 is substantially similar to and may correspond to the upper piece 204 of the structure 202 of FIGS. 2A-2C. The lower piece 528, however, includes some dissimilar features described below.

In FIGS. 5B and 5C, the upper piece 526 is shown separate from the lower piece 528. FIG. 5A depicts the upper piece 526 assembled with the lower piece 528. The upper piece 526 may include the upper wall 504, the rear wall 524, and upper portions of the side walls 530A/530B. The lower piece 528 may include the lower wall 508 and lower portions of the side walls 532A/532B (532B not visible in FIG. 5A). The upper portions of the side walls 530A/530B may engage with lower portions of the side walls 532A/532B to secure the upper piece 526 to the lower piece 528.

With combined reference to FIGS. 1C and 5A-5C, in these and other embodiments, the upper piece 526 may include connectors 522 used to secure the upper piece 526 to the PCB 106. The connectors 522 included on the upper piece 526 may extend from the rear wall 524 to be received in one or more of the pin openings 116 defined in the PCB 106. The connectors 522 may be soldered or otherwise secured to the PCB 106 to mechanically and/or electrically couple the upper piece 526 to the PCB 106.

Referring back to FIGS. 5A-5C, module-grounding tabs 518A and 518B may also extend from the structure 502. Specifically, in the depicted embodiment, the structure 502 includes a first type of module-grounding tab 518A extending from the side walls 506A/506B. The first type of module-grounding tab 518A is substantially similar to the module-grounding tabs 212 described with reference to FIGS. 2A-2C.

A second type of module-grounding tab 518B may extend from the lower wall 508. Note only one of the second type of module-grounding tabs 518B is labeled in FIGS. 5A-5C. Rather than contacting a side of a module as the first type of module-grounding tab 518A, the second type of module-grounding tab 518B contacts a bottom surface of a module. The module-grounding tabs 518A and/or 518B may provide a chassis ground for the modules.

The structure 502 also includes an outer edge 516 opposite the rear wall 524. The outer edge 516 is defined along the upper wall 504, the lower wall 508, and the two side walls 506A/506B. In the depicted embodiment, along the side walls 506A/506B, the outer edge 516 is defined along the upper piece 526 (i.e., the upper portions of the side walls 530A/530B) and not defined along the lower piece 528 (i.e., the lower portions of the side walls 532A/532B). Fingers 510 may extend from the outer edge 516. The fingers 510 may be configured to contact a bezel around an opening. For example, with combined reference to FIGS. 1C and 5A-5C, the fingers 510 may be configured to contact the bezel 102 around the opening 110. The fingers 510 that extend from the upper piece 526, that is, along a portion of the outer edge 516 defined along the upper wall 504 and the two side walls 506A/506B may be curved. However, each of the finger 510 that extends from a portion of the outer edge 516 defined along the lower wall 508 may be substantially straight. The fingers 510 may be substantially evenly spaced along the outer edge 516 and thus substantially evenly spaced around the opening.

FIG. 6 illustrates a partial, sectional view of the PCIe card 100 of FIGS. 1A-1C including the second EMR shield 500 described with reference to FIGS. 5A-5C. The module 104, the bezel 102, and the PCB 106 described with reference to FIGS. 1A-1C and the second EMR shield 500 described with reference to FIGS. 5A-5C are included in FIG. 6. The second EMR shield 500 is depicted mechanically coupled to the PCB 106 through the connectors 522 being received in the PCB 106. The second type of module-grounding tabs 518B is shown contacting the module 104. Additionally, FIG. 6 depicts the modules 104 mechanically coupled to the PCB 106 through the module pin 120 being received in the PCB 106. In this configuration, the modules 104 are at least partially enclosed by the second EMR shield 500. Specifically, the upper wall 504 borders the top surface 122, the rear wall 524 borders the rear surface 126, and the lower wall 508 borders the bottom surface 128.

Additionally, FIG. 6 depicts an EMR source 604. The second EMR shield 500 reduces EMR escaping from the opening 110 by the fingers 510 contacting the bezel 102 around the opening 110 at one or more contact areas 602 and 610. The contact areas 602 and 610 substantially surround the opening 110 and thereby shield at least a portion of the EMR emitted by the EMR source 604.

In the sectional view, the different shapes of the fingers 510 are clearly visible. The fingers 510 that extend from the upper wall 504 are curved, which may produce a first contact area 602 where the fingers 510 that are curved contact the bezel 102. Additionally, the fingers 510 that extend from the lower wall 508, which are substantially straight, may produce a second contact area 610. The fingers 510 that are substantially straight may allow the bezel 102 to be positioned closer to the PCB 106, for instance.

Figure 7:
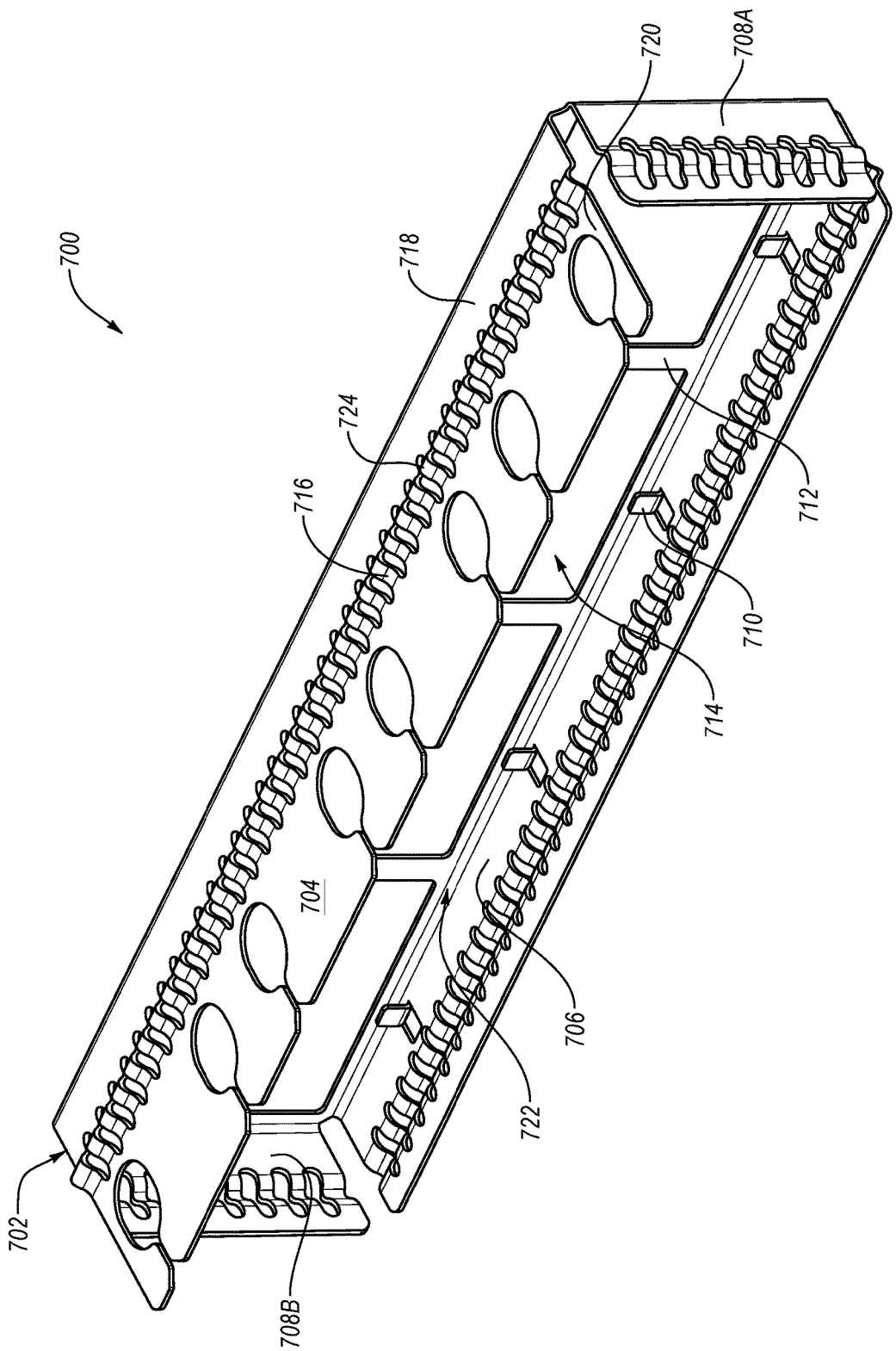
FIG. 7 is a third example EMR shield that may be implemented in the PCIe card of FIGS. 1A-1C.

FIG. 7 illustrates a third example EMR shield 700 that may be implemented in the PCIe card 100 of FIGS. 1A-1C. The third EMR shield 700 includes a structure 702 configured to substantially surround modules, such as the modules 104 of FIGS. 1A-1C. FIG. 7 depicts the third EMR shield 700 upside down when compared to the EMR shield 200 depicted in FIG. 2A and the second EMR shield 500 depicted in FIG. 5A.

With combined reference to FIGS. 1A-1C and 7, the structure 702 includes an upper wall 706 which may be configured to be positioned parallel to the top surface 122, a lower wall 704 which may be configured to be positioned parallel to a bottom surface 128, and two side walls 708A and 708B which may be configured to be positioned parallel to side surfaces 124. The structure 702 also includes a front wall 722. The upper wall 706, the lower wall 704, and the two side walls 708A and 708B may be substantially perpendicular to the front wall 722. The front wall 722 may define at least one module opening 714. One of the modules 104 may be positioned in each of the at least one module openings 714. A vertical slat 712 may be positioned between the module openings 714 such that when modules 104 are positioned in the module openings 714, the vertical slats 712 are positioned between adjacent modules 104. Note that only one each of the module openings 714 and the vertical slats 712 are explicitly labeled in FIG. 7.

Referring back to FIG. 7, each of the upper wall 706, the lower wall 704, and the two side walls 708A and 708B include a first portion 718 and a second portion 720. The first portion 718 may be configured to be positioned inside an opening, such as the opening 110 described herein. The second portion 720 may be configured to be positioned outside the opening. The first portion 718 and the second portion 720 may be connected by fingers 716. The fingers 716 are substantially equivalent in structure and function to the fingers 510 and 210 described herein. For example, the fingers 716 may be configured to contact a bezel at multiple contact areas (described below) substantially surrounding an opening. However, rather than extending from the structure 702 as the fingers 510 and 210, the fingers 716 are formed integrally to the structure 702 as ridges. Specifically, each of the fingers 716 may include a raised portion 724 configured to contact a bezel when the first portion 718 is positioned in an opening of the bezel.

The structure 702 may also include module-grounding tabs 710. The module-grounding tabs 710 may extend from the upper wall 706. The module-grounding tabs 710 may contact a top surface of a module. For example, with combined reference to FIGS. 1C and 7, the module-grounding tabs 710 may contact the top surface 122 of the modules 104 when the modules 104 are positioned in the opening 110.

Figure 8:
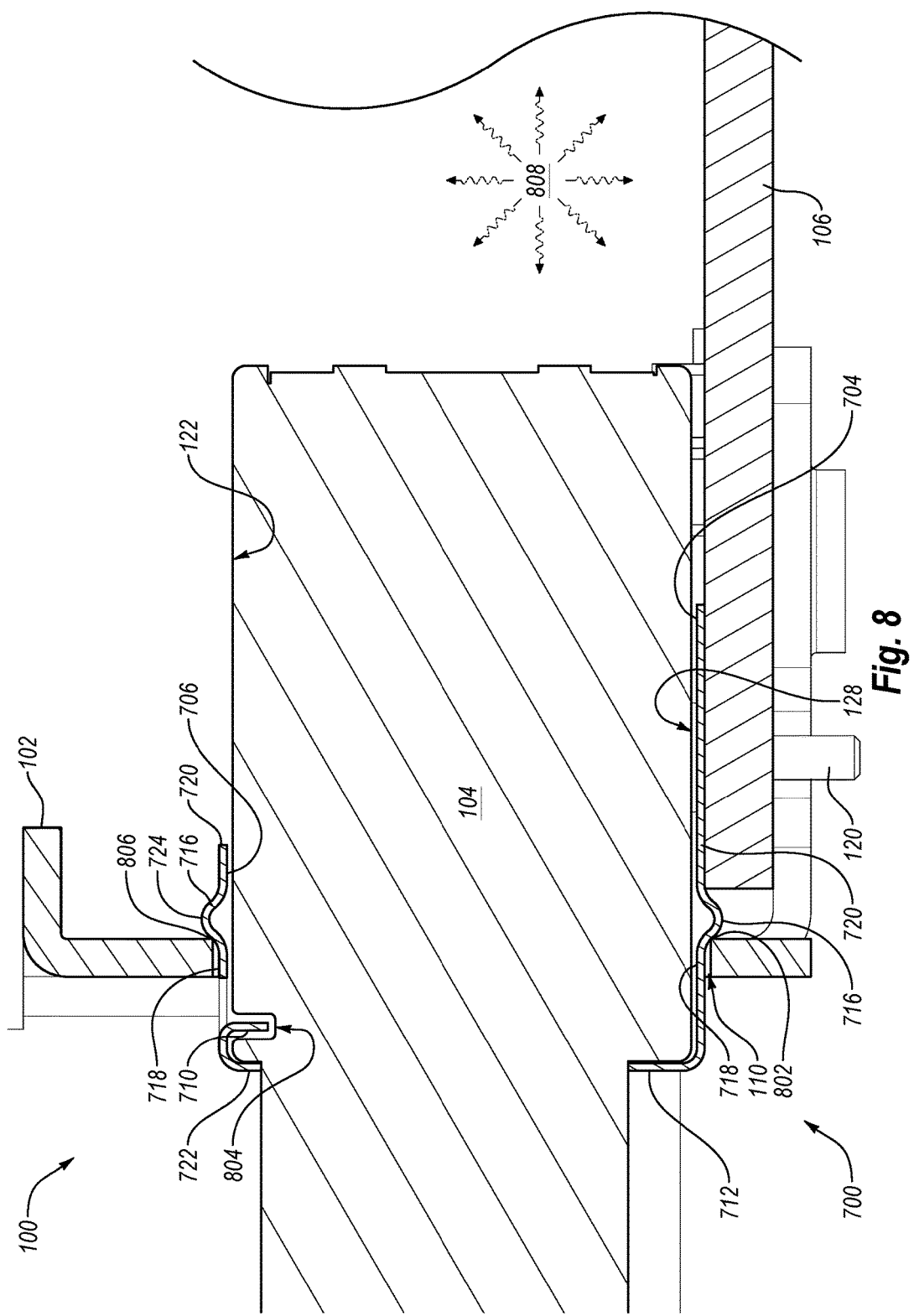
FIG. 8 is a partial, sectional view of the PCIe card of FIGS. 1A-1C including the third example EMR shield of FIG. 7.

FIG. 8 illustrates a sectional view of the PCIe card 100 of FIGS. 1A-1C including the third EMR shield 700 described with reference to FIG. 7. The module 104, the bezel 102, and the PCB 106 described with reference to FIGS. 1A-1C and the third EMR shield 700 described with reference to FIG. 7 are included in FIG. 8. The module-grounding tab 710 is shown engaging a recess 804 included in the module 104. Additionally, FIG. 8 depicts the modules 104 mechanically coupled to the PCB 106 through the module pins 120 being received in the PCB 106. In this configuration, the modules 104 are substantially surrounded by the third EMR shield 700. Specifically, the upper wall 706 borders the top surface 122 and the lower wall 704 borders the bottom surface 128.

FIG. 8 further depicts an EMR source 808 which generates EMR that may escape the PCIe card 100 through the opening 110. The third EMR shield 700 reduces EMR escaping from the opening 110, by positioning the front wall 722 and/or the vertical slat 712 to block some EMR escaping from around the modules 104. Additionally, the third EMR shield 700 reduces EMR escaping from the opening 110 by the fingers 716 contacting the bezel 102 around the opening 110 at one or more contact areas 802. Specifically, when implementing the third EMR shield 700, the contact areas 802 include an edge 806 of the opening 110. For example, when the first portion 718 of the third EMR shield 700 is positioned in the opening 110 and the second portion 720 is positioned outside the opening 110, the raised portions 724 of the fingers 716 contact the edge 806 of the opening 110. The contact between the fingers 716 and the edge 806 of the opening 110 reduce the EMR escaping through the opening 110.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A peripheral component interconnect express (PCIe) card comprising:
   a printed circuit board (PCB);
   a bezel defining an opening that is mechanically coupled to a first end of the PCB, the bezel including contact areas on at least portions of a surface of the bezel facing the PCB around an edge of the opening;
   two or more independent transceiver modules electrically coupled to the PCB, the transceiver modules extending from the first end of the PCB in a first direction such that a first portion of each of the transceiver modules is positioned in the opening, wherein each of the transceiver modules include a second portion that extends in a second direction from the bezel towards the PCB, and the transceiver modules are positioned adjacent to one another such that at least one side surface of the second portion of each of the transceiver modules is immediately adjacent to a side surface of another of the transceiver modules; and
an electromagnetic radiation (EMR) shield that substantially surrounds the transceiver modules, the EMR shield comprising:
an upper wall positioned in contact with top surfaces of the transceiver modules,
a lower wall positioned in contact with bottom surfaces of the transceiver modules and that includes a plurality of features through which mounting features of the transceiver modules extend,
a first side wall positioned in contact with one of the side surfaces of one of the transceiver modules,
a second side wall positioned in contact with one of the side surfaces of another of the transceiver modules,
a front wall perpendicular to the lower wall, the side walls, and the upper wall and defining four module openings through which one of the transceiver modules extends, the four module openings being separated by vertical slats positioned between first portions of adjacent transceiver modules, and
module-grounding tabs that extend from the upper wall and contact a top surface of each of the transceiver modules when the transceiver modules are positioned in the opening, wherein:
the upper wall, the lower wall, the side walls each include a first portion and a second portion that are connected by fingers that include raised portions that extend in directions away from the module openings, the fingers being positioned in contact with the contact areas of the bezel at multiple contact areas surrounding the opening of the bezel, and the fingers connecting the first portion of the lower wall and the second portion of the lower wall are positioned between the first end of the PCB and the bezel.

2. The PCIe card of claim 1, wherein the EMR shield does not extend to rear portions of the transceiver modules.

3. The PCIe card of claim 2, wherein:
the lower wall extends a first distance from the front wall;
the upper wall extends a second distance from the front wall; and
the first distance is shorter than the second distance.

4. The PCIe card of claim 3, wherein parts of the first portions of the upper wall, the lower wall, the side walls are positioned in the opening along with the first portions of the transceiver modules.

5. The PCIe card of claim 4, wherein a part of the second portion of the lower wall is positioned in contact with the bottom surfaces of the transceiver modules and a surface of the PCB.

6. The PCIe card of claim 5, wherein the EMR shield is configured such that transceiver modules are received in the EMR shield then the transceiver modules and the EMR shield are attached to the PCB, and then the parts of the first portions and the transceiver modules are introduced into the opening of the bezel.

7. The PCIe card of claim 6, wherein the two or more independent transceiver modules includes four transceiver modules.

8. The PCIe card of claim 7, wherein each of the transceiver modules includes an LC transmit port and an LC receive port configured to send and receive optical signals over optical fibers.

9. The PCIe card of claim 8, wherein each of the transceiver modules includes is substantially compliant with the SFP+ MSA.

10. A electromagnetic radiation (EMR) shield assembly, comprising:
a bezel defining an opening that is configured to be mechanically coupled to a first end of a printed circuit board (PCB), the bezel including contact areas on at least portions of a surface of the bezel facing the PCB around an edge of the opening, the opening of the bezel being configured to receive two or more transceiver modules such that a first portion of each of the transceiver modules is positioned in the opening and the transceiver modules are positioned adjacent to one another such that at least one side surface of each of the transceiver modules is immediately adjacent to a side surface of another of the transceiver modules; and
an electromagnetic radiation (EMR) shield including:
an upper wall configured to be positioned in contact with top surfaces of transceiver modules received by the bezel,
a lower wall configured to be positioned in contact with bottom surfaces of the transceiver modules and that includes a plurality of features through which mounting features of the transceiver modules extend,
a first side wall configured to be positioned in contact with one of the side surfaces of one of the transceiver modules,
a second side wall configured to be positioned in contact with one of the side surfaces of another of the transceiver modules,
a front wall perpendicular to the lower wall, the side walls, and the upper wall and defining four module openings through which one of the transceiver modules extends, the four module openings being separated by vertical slats positioned between first portions of adjacent transceiver modules, and
module-grounding tabs that extend from the upper wall and contact a top surface of each of the transceiver modules when the transceiver modules are positioned in the opening,
wherein:
the upper wall, the lower wall, the side walls each include a first portion and a second portion that are connected by fingers that include ridges that extend in directions away from the module openings, the fingers being positioned in contact with the contact areas of the bezel at multiple contact areas surrounding the opening of the bezel, and the fingers connecting the first portion of the lower wall and the second portion of the lower wall are positioned between the first end of the PCB and the bezel.

11. The EMR shield assembly of claim 10, wherein:
the lower wall extends a first distance from the front wall;
the upper wall extends a second distance from the front wall; and
the first distance is shorter than the second distance.

12. The EMR shield assembly of claim 10, wherein:
parts of the first portions of the upper wall, the lower wall, the side walls are positioned in the opening; and
wherein a part of the second portion of the lower wall is configured to be positioned between installed transceiver modules and a surface of a PCB.

13. A peripheral component interconnect express (PCIe) card, comprising:
a PCB;

two or more independent transceiver modules; and
the EMR shield assembly of claim 10.

14. A peripheral component interconnect express (PCIe) card comprising:
- a printed circuit board (PCB);
- a bezel defining an opening that is mechanically coupled to a first end of the PCB, the bezel including contact areas on at least portions of a surface of the bezel facing the PCB around an edge of the opening;
- two or more transceiver modules electrically coupled to the PCB and at least partially positioned in the opening, wherein each of the transceiver modules include a portion that extends from the bezel towards the PCB and the transceiver modules are positioned adjacent to one another such that at least one side surface of each of the transceiver modules is immediately adjacent to a side surface of another of the transceiver modules; and
- an electromagnetic radiation (EMR) shield comprising:
  - an upper wall positioned in contact with top surfaces of the transceiver modules,
  - a lower wall positioned in contact with bottom surfaces of the transceiver modules and that includes a plurality of features through which mounting features of the transceiver modules extend,
  - a first side wall positioned in contact with one of the side surfaces of one of the transceiver modules,
  - a second side wall positioned in contact with one of the side surfaces of another of the transceiver modules,
  - a front wall perpendicular to the lower wall, the side walls, and the upper wall and defining four module openings through which one of the transceiver modules extends, the four module openings being separated by vertical slats positioned between first portions of adjacent transceiver modules, and
  - module-grounding tabs that extend from the upper wall and contact a top surface of each of the transceiver modules when the transceiver modules are positioned in the opening, wherein:

the upper wall, the lower wall, the side walls each include a first portion and a second portion that are connected by fingers that include raised portions that extend in directions away from the module openings, the fingers being positioned in contact with the contact areas of the bezel at multiple contact areas surrounding the opening of the bezel, and the fingers connecting the first portion of the lower wall and the second portion of the lower wall are positioned between the first end of the PCB and the bezel.

15. The PCIe card of claim 14, wherein:
the EMR shield does not extend to rear portions of the transceiver modules;
the lower wall extends a first distance from the front wall;
the upper wall extends a second distance from the front wall; and
the first distance is shorter than the second distance.

16. The PCIe card of claim 14, wherein:
at least parts of the first portions of the upper wall, the lower wall, the side walls are positioned in the opening along with the first portions of the transceiver modules;
a part of the second portion of the lower wall is positioned in contact with the bottom surfaces of the transceiver modules and a surface of the PCB;
the EMR shield is configured such that transceiver modules are received in the EMR shield then the transceiver modules and the EMR shield are attached to the PCB, and then the parts of the first portions and the transceiver modules are introduced into the opening of the bezel; and
the two or more transceiver modules includes four transceiver modules.

17. The PCIe card of claim 14, wherein:
at least one of the transceiver modules includes an LC transmit port and an LC receive port configured to send and receive optical signals over optical fibers; and
at least one of the transceiver modules includes is substantially compliant with the SFP+ MSA.

* * * * *